J. H. CLASS.
COMBINATION VEHICLE BODY.
APPLICATION FILED APR. 7, 1916.

1,278,858.

Patented Sept. 17, 1918.
3 SHEETS—SHEET 1.

WITNESSES

INVENTOR
John H. Class
BY
Richard Owen.
ATTORNEY

J. H. CLASS.
COMBINATION VEHICLE BODY.
APPLICATION FILED APR. 7, 1916.
1,278,858.
Patented Sept. 17, 1918.
3 SHEETS—SHEET 2.
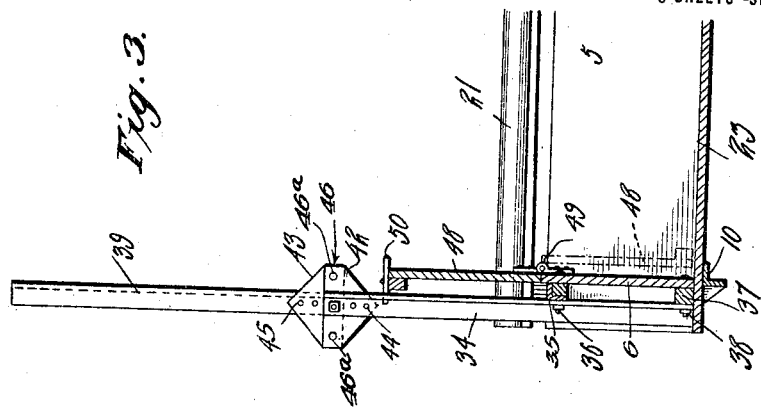
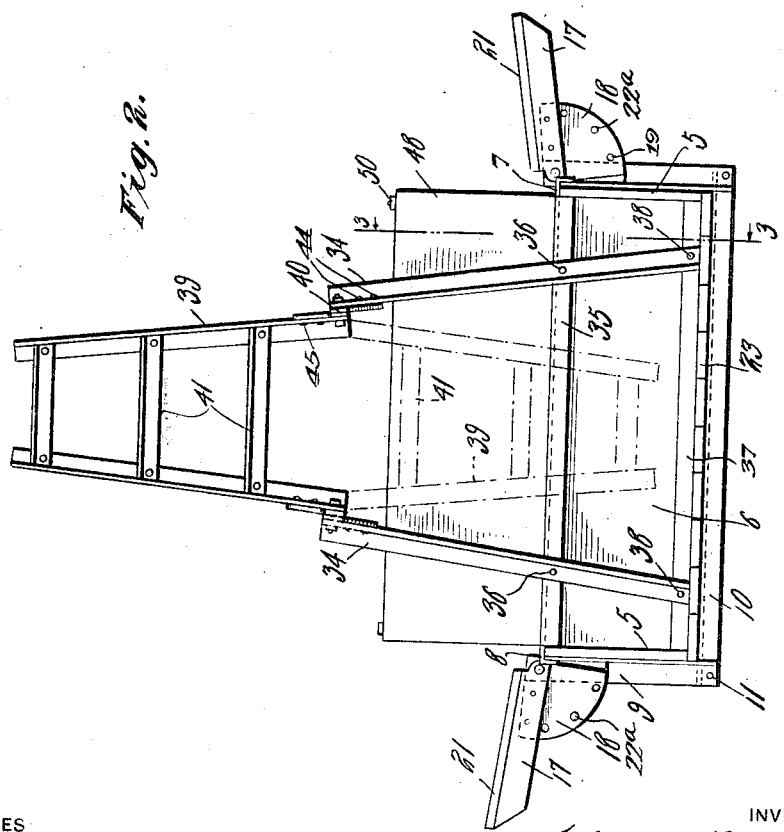

J. H. CLASS.
COMBINATION VEHICLE BODY.
APPLICATION FILED APR. 7, 1916.
1,278,858.
Patented Sept. 17, 1918.
3 SHEETS—SHEET 3.
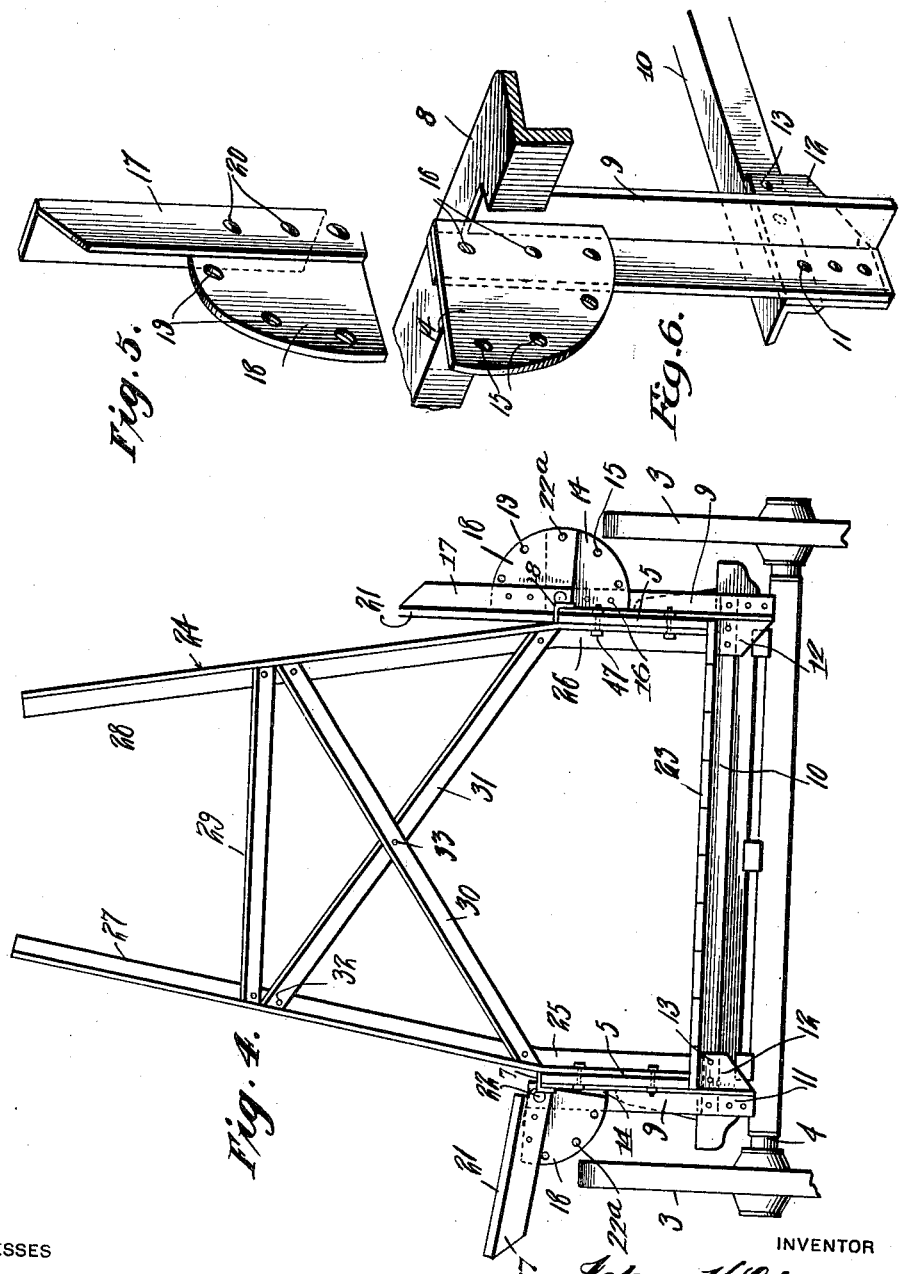
WITNESSES
INVENTOR
John H. Class
BY
Richard B. Owen.
ATTORNEY

UNITED STATES PATENT OFFICE.

JOHN H. CLASS, OF DAYTON, OHIO.

COMBINATION VEHICLE-BODY.

1,278,858.
Specification of Letters Patent.
Patented Sept. 17, 1918.

Application filed April 7, 1916. Serial No. 89,698.

*To all whom it may concern:*

Be it known that I, JOHN H. CLASS, a citizen of the United States, residing at Dayton, in the county of Montgomery and State of Ohio, have invented certain new and useful Improvements in Combination Vehicle-Bodies, of which the following is a specification.

This invention relates to a combined body for vehicles, and more specifically to a combined box bed and hay rack construction.

The primary object of the invention is to provide a commercial wagon bed which may be adapted as a box bed, or by slight modifications, may be readily converted into a hay rack.

Another object of the invention resides in the novel construction of the side boards of the wagon bed, the same being hingedly mounted and provided with means whereby they may be securely supported in an adjusted position for use with the usual box bed; and further, to provide for means whereby the said side boards may be so adjusted as to be used in conjunction with a hay rack.

A still further object of the invention, is to provide suitable truss members, which serve a dual function, namely, as efficient means for bracing the wagon bed, and, also, as means whereby the hay supporting ladders, as used in conjunction with the conventional form of hay racks, may be supported in a rigid, upright position.

It is also contemplated by the invention, to provide for hay supporting ladders, which are constructed from suitable material, such as, angle irons, or the like, one of said ladders being pivoted intermediate its length to allow for the folding thereof into an out of the way position, when not in use. The remaining, or second supporting ladder, constitutes a substantially rigid construction, and is of such size and width as to be readily engageable with the fixedly mounted side boards of the wagon bed; means being provided whereby the second supporting ladder may be detachably connected with said side boards.

All of the foregoing, together with additional advantageous features and arrangement of parts of the preferred embodiment of my invention will be clear from the specific description hereinafter contained when read in connection with the accompanying drawings forming a part hereof, wherein said embodiment of the invention is illustrated for the purpose of facilitating a full understanding of the present improvements.

In the drawings:—

Fig. 2 is a front elevation of the improved wagon bed;

Fig. 3 is a section taken on the line 3—3 of Fig. 2;

Fig. 4 is a rear elevation of the wagon bed;

Fig. 5 is a detail in perspective of the supporting arm for the movable side boards; and Fig. 6 is a detail in perspective of the supporting arm for the rigid side boards.

Figure 1:
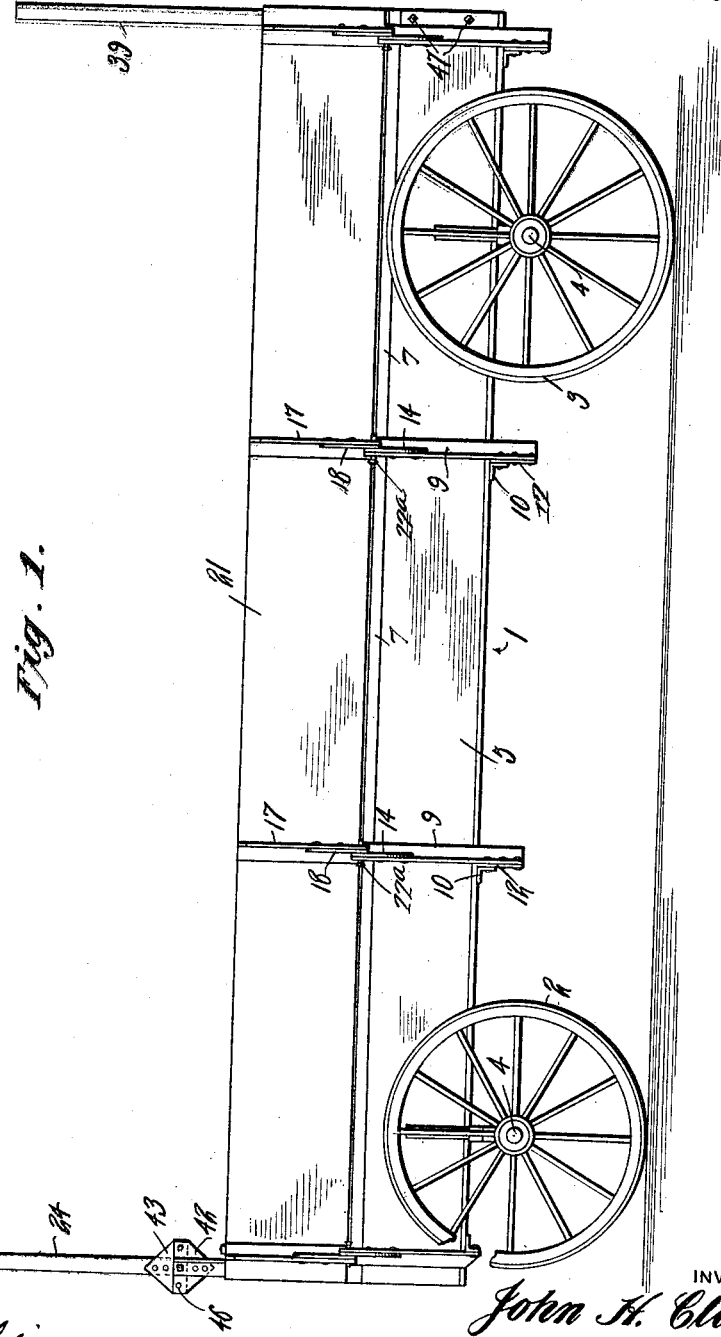
Figure 1 is a side elevation, showing a wagon having the bed thereof constructed in accordance with my invention.

Referring now to the drawings wherein like references designate like or corresponding parts throughout the several views, 1 designates the wagon bed, as an entirety, the same being supported upon forward and rearward wheels, generally numbered 2 and 3, which wheels are in turn received by axle members numbered 4, which axle members, suitably support the wagon bed 1. The wagon bed comprises side and end portions 5 and 6, respectively, which are so arranged as to constitute the usual box bed and are receivable within truss frame members, which truss frame members constitute a plurality of longitudinal angle bars 7 and 8, which have connected thereto, at their adjacent ends, and intermediate their length, a plurality of vertical angle bars, generally numbered 9. The vertical angle bars 9 have connected thereto, at their lower extremities horizontally and transversely extending bars 10, the said transverse bars being connected to the vertical angle bars 9, as at 11, by means of suitable fastening devices. The connection may be made, by means of a web plate 12, which is secured or formed upon the lower extremities of the angle bars, and is secured to the outer ends of the transverse bars, as at 13, thus, affording a rigid construction. It is to be also noted that the side portions 5 of the wagon bed 1 may be secured to the vertically arranged angle bars 9, at suitable intervals, whereby the same may be rigidly supported in their upright position. Arranged upon the upper ends of the vertical angle bars 9, are segments, generally numbered 14, which segments are provided with, adjacent their curved marginal edges, a plurality of apertures 15, the segments 14 being secured to the upper ends of the angle bars 9 by means of rivets, or other fastening devices, as designated at 16. Pivotally connected to the upper ends of the angle bars 9 are angle arms 17, which angle arms are provided with, at their lower extremities, complementally formed segments 18 similar to the segments 14, the segments 18 also, having arranged adjacent their curved marginal edges, apertures 19. The segments 18 are secured to the lower extremities of angle arms 17 by means of suitable fastening devices, such as rivets or the like 20. Any number of the vertical angle bars 9 and pivotally mounted angle arms 17 may be provided, this depending entirely upon the size of the wagon or vehicle. Secured to the upper sides of the angle bars 17, are supplemental side boards 21, the same being held in rigid connection therewith, by suitable fastening devices. Any form of pivots may be used to connect the adjacent extremities of the members 9 and 17, such, for instance, as a pin 22, which is shown to advantage in Fig. 4. To provide for means whereby the segments 14 and 18 may be locked in an adjusted position, that is to say when the apertures 15 and 19, have been alined therein, I may use any form of locking means, such as a pin 22ª.

It is, of course, to be understood that the wagon bed is provided with the usual flooring which I have designated at 23, it being preferable, in this particular embodiment, that the flooring be of the sectional type, so that it may be readily removed.

In order to provide for the hay supporting ladders, as used in conjunction with the usual hay rack, I provide different types of ladders, one being of an entirely rigid construction, while the remaining ladder is of the foldable type so that the same may be folded in an out of the way position, when not in use. Referring more specifically to the ladders, I designate the rigid ladder construction by the character 24, which ladder includes vertical side pieces formed from angle iron, or the like, numbered 25 and 26, the upper extremities of said side members 25 and 26 being inclined as at 27 and 28. To provide for means whereby the upper extremities of the members 27 and 28 may be held in spaced relation and may be so formed as to afford a substantially rigid construction, I provide a horizontal space bar 29, which is secured at either end to the members 24 and 25, and as further bracing means, I provide oppositely inclined cross bars 30 and 31, which bars are also securely affixed to the side members 25 and 26, by suitable fastening devices, such as rivets or the like. These fastening devices are generally numbered as at 32, while the bars 30 and 31 are secured at their intersecting points by a fastening device, as indicated at 33. The foldable ladder construction may be stated to include a pair of upwardly convergent arms 34 which are secured to a transversely arranged angle bar 35, which in turn is secured to the longitudinal bars 7 and 8 in any suitable manner, by means of rivets, or other fastening devices, as indicated at 36, while the lower extremities of said bars 34 are secured to a similar transversely arranged truss member 37, as at 38. Pivotally secured as at 40 to the upper extremities of said bars 34, is a second set of similarly formed angle bars 39, which bars 39 are braced intermediate their length by transversely arranged connecting members generally numbered 41, which connecting members are securely affixed thereto. The adjacent ends of the bars 34 and 40 are provided with connecting plates 42 and 43, which are securely affixed to their respective bars by means of rivets generally numbered 44 and 45, said plates being provided with, adjacent their upper marginal edges, registrable apertures, designated as at 46, these apertures being adapted to receive therethrough, locking pins or the like as shown at 46ª. By this construction, it will be obvious that the pivotally supported bars 39 may be held in a substantially rigid manner with relation to the supporting bars 34, when it is desired that the same should be used as a hay ladder. When it is desired to move the same into an inoperative or in an out of the way position, it is merely necessary to remove the locking pins 46ª, whereupon the member 39 may be readily folded into an out of the way position, as shown by the dot and dash lines in Fig. 2. Although, the members 34 have been shown as rigidly connected to the wagon bed, it is obvious that the same may be readily detached from the wagon bed. To this end, attention is also directed to the fact, that the rigid ladder construction is removably supported by the side portions or boards, by means of bolts 47, as shown in Fig. 1. When it is desired to remove the rigid ladder it is only necessary that these bolts be detached, whereupon the ladder may be readily taken down. In this particular embodiment, I have shown the rigid ladder construction as being mounted in the rearward end of the wagon bed, while the foldable ladder structure is positioned at the front of the bed; however, it is to be appreciated that the disposition of the ladder structure forms no part of the invention, inasmuch as the same may be positioned in any suitable manner upon the wagon bed, such as conditions or preferences may dictate.

Referring now to the operation of the device, and assuming that the user is desirous of having the body converted into a box bed, it will be apparent that it is only necessary to remove the ladder structure, while the pivotally mounted portion 39 of the foldable ladder is folded into an out of the way position as shown in Fig. 2. The movable side boards 21 are then moved into vertical position and in alinement with the rigid side portions, whereupon the complementally arranged recesses 15 and 19 are alined, in order that a locking pin, or the like, may be passed therethrough, thus, affording means, whereby said movable side members 21 may be rigidly held in their vertical, or alined position. Movable end members 48 pivotally carried upon the end portions 6 as at 49, may be moved into an upright position, as shown to advantage in Fig. 3, and held in this upright position by means of rotatable locking bolts 50, which bolts are engageable with the movable side portions 21. When the user is desirous of converting the box bed, as above described, into the usual form of hay rack, it is only necessary that the ladder structures be placed in position, or if the same have not been detached, it is only necessary that the section 39 of the foldable ladder be raised into vertical position, so that the apertures in the plate 43, carried by said movable structure, will aline with the apertures as arranged in the plate 42, whereupon a locking device is passed therethrough, and the structure is rigidly held in its vertical position. The end gates 48 may be then folded into an out of the way position, as shown to advantage in the dotted lines in Fig. 3 while the movable side members may be then adjusted into horizontal position, and locked in this position by means of passing locking pins 22ª through the registering openings 15 and 19. If it is so desired, the movable flooring 23 may be then removed, however, this remains with the option of the user.

From the foregoing, it will be apparent that by a slight modification, the body of the vehicle has been converted from the usual bed to the conventional form of hay rack, thus providing for a body particularly desirable for farming purposes.

In accordance with the provisions of the patent statutes, I have described the principle of my invention, together with such construction as I now consider to represent the best embodiment thereof, but I desire to have it understood that the construction shown is only illustrative and that different arrangements of the parts from those herein shown and described for producing the desired results may be employed, together with mechanical equivalents for some or all parts as may be in keeping with hereto appended claims.

Having thus fully described my invention, what I claim as new and desire to secure by Letters Patent, is:—

1. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, longitudinal beams joining the upper ends of the vertical standards, supplemental side members including standards adjustably hinged to the vertical side standards, a front end having a hinged portion with a lock for engaging the supplemental side members when moved to a vertical position, and a bracing beam disposed across the front of the wagon body and connected to the adjacent vertical standards to keep the sides from spreading.

2. A wagon body including a bottom and side boards, vertical standards supporting the side boards, the lower ends of the standards projecting below the bottom, transverse beams joined between pairs of the vertical standards, longitudinal beams joined to the upper ends of the vertical standards, supplemental side members including standards adjustably hinged to the vertical side standards, a front end having a hinged portion with a lock for engaging the supplemental side members when moved to a vertical position, and a bracing beam disposed across the front of the wagon body and connected to the adjacent vertical standards to keep the sides from spreading.

3. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, longitudinal beams joining the upper ends of the vertical standards, supplemental side members including standards adjustably hinged to the vertical side standards, and a front end having a hinged portion with a lock for engaging the supplemental side members when moved to a vertical position.

4. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, longitudinal beams joining the upper ends of the vertical standards, and supplemental side members including standards adjustably hinged to the vertical side standards.

5. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, longitudinal beams joining the upper ends of the vertical standards, supplemental side members including standards adjustably hinged to the vertical side standards, and a bracing beam disposed across the front of the wagon body and connected to the adjacent vertical standards to keep the sides from spreading.

6. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, supplemental side members including standards adjustably hinged to the vertical side standards, a front end having a hinged portion with a lock for engaging the supplemental side members when moved to a vertical position, and a bracing beam disposed across the front of the wagon body and connected to the adjacent vertical standards to keep the sides from spreading.

7. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, supplemental side members including standards adjustably hinged to the vertical side standards, and a front end having a hinged portion with a lock for engaging the supplemental side members when moved to a vertical position.

8. A wagon body including a bottom and side boards, vertical standards supporting the side boards, the lower ends of the standards projecting below the bottom, transverse beams joined between pairs of the vertical standards, brace plates secured at the juncture of the transverse beams and the projecting ends of the vertical standards, supplemental side members including standards adjustably hinged to the vertical side standards, and a bracing beam disposed across the front of the wagon body and connected to the adjacent vertical standards to keep the sides from spreading.

In testimony whereof I affix my signature in presence of two witnesses.

JOHN H. CLASS.

Witnesses:
W. K. RHONEMUS,
R. A. JACKSON.

Copies of this patent may be obtained for five cents each, by addressing the "Commissioner of Patents, Washington, D. C."